Sept. 12, 1967  C. D. FORMAN ET AL  3,341,051
CRYOGENIC INSULATING SYSTEM
Filed Dec. 24, 1964

INVENTORS
CHARLES D. FORMAN
AUGUSTUS B. SMALL
BY
WHELAN, CHASAN, LITTON, MARX & WRIGHT
ATTORNEYS

12 United States Patent Office 3,341,051
Patented Sept. 12, 1967

3,341,051
CRYOGENIC INSULATION SYSTEM
Charles D. Forman, Elizabeth, and Augustus B. Small,
Westfield, N.J., assignors to Esso Research and Engineering Company, a corporation of Delaware
Filed Dec. 24, 1964, Ser. No. 420,979
2 Claims. (Cl. 220—9)

ABSTRACT OF THE DISCLOSURE

The present invention relates to a cryogenic insulation system in which a primary liquid and vapor impermeable barrier is supported directly by a load-bearing structure including insulation and a secondary liquid and vapor impermeable barrier. The primary barrier is comprised of prefabricated panels fabricated from a plastic-metal foil laminate which is dimensionally stable at extremely low temperatures. The invention also contemplates the formation of a cavity betwen the primary barrier panels and the secondary barrier insulation panels to define a leak detection network to constantly monitor for the presence of cargo gas.

---

The present invention relates to cryogenic insulation systems for use in the cargo holds of seagoing vessels, and more particularly to so-called integrated cryogenic insulation systems in which a primary liquid and vapor impermeable barrier is supported directly by a load-bearing structure including insulation and a secondary liquid and vapor impermeable barrier.

In the storage and marine transportation of natural gases, it is most practical and economically feasible to reduce the volume of the gases through their conversion to a liquefied state and to maintain the liquefied gases at atmospheric pressures. Under such conditions the gases are at extremely low or cryogenic temperatures, liquefied methane at atmospheric pressure having a vaporization point of about −260° F., for example.

Container systems for supercooled liquefied gases must adequate thermally insulate the liquefied gas to prevent its volatilization and expansion. Moreover, an acceptable container must be of sufficient strength and structural integrity to prevent the escape of the gas therefrom, since the supercooling effects of the liquefied gases would be extremely deleterious to the ship structure and are such as to embrittle and to thermally overstress the surrounding mild steel ship plate. Accordingly, in order to maintain a high degree of safety, it has been well accepted and statutorily required practice to include at least two liquid- and vapor-tight barriers in cryogenic containers employed in shipboard applications for the isolation of the supercooled cargo from the ship structure.

One typical arrangement for the marine transportation of a liquefied gas involves the use of aluminum or stainless steel storage tanks, constituting primary barrier means, independently supported by a secondary liquid- and vapor-tight barrier in the cargo holds. Another known arrangement involves the use of a so-called integrated construction where a non-self-supporting primary barrier is directly supported by a structure including a secondary barrier.

The present invention represents an improvement in the so-called integrated systems and is directed particularly to a new and improved construction therefor. Specifically, a closed supporting structure for the container, usually the walls of the ship cargo hold, is lined with a plurality of effectively dimensionally stable insulating panels arrayed in a contiguous, end-to-end, side-by-side manner to define a liquid- and vapor-tight secondary barrier. Advantageously, the panels are stepped and generally similar in construction to those illustrated and described in more detail in copending United States application Ser. No. 394,287, filed Sept. 3, 1964, by Harold R. Pratt et al. for "Insulation System." In accordance with the present invention, a liquid and vapor impermeable primary barrier may be formed from a plurality of new and improved dimensionally stable primary barrier panels superimposed upon the secondary barrier panels and fastened thereto, without extrinsic expansion joints, by spaced screws or like mechanical means. The primary panels, which are otherwise independent of the secondary barrier, are arrayed in contiguous end-to-end and side-by-side, abutted relation, and the joints therebetween are made effectively continuous and liquid- and vapor-tight by overlapping auxiliary sheets of dimensionally stable material.

As a specific aspect of the invention, the primary barrier panels themselves are fabricated from new plastic-metal foil laminates which are effectively dimensionally stable at the extremely low temperatures of liquefied natural gases. More specifically, the laminates include a metal foil layer bonded to a fiberglass reinforced polyester under heat and pressure. The metallic layer is an aluminum foil, a copper foil, a stainless steel foil, or a like metallic material which retains its integrity at cryogenic temperatures, and, in certain embodiments, may be sandwiched between two layers of fiberglass reinforced polyester. In accordance with the invention, the effective dimensional stability of panels formed from the plastic-metal foil laminates obviates the need for expansion joints in the construction of a primary liquid-tight barrier.

As an important aspect of the invention, the interface between the primary and secondary barrier panels defines a leak detection network which is constantly monitored for the presence of the cargo gas, the detection of which is indicative of a discontinuity or failure in the primary barrier. More specifically, the faces of one of the primary and secondary barriers include molded concavities which cooperate with the face of the other barrier to define channels therebetween. The channels thus formed are in direct communication at all times with both a gas monitoring device and the interface between the barriers and, accordingly, they serve to conduct immediately any leakage present at the interface to the monitoring device.

The new and improved integrated system is especially reliable and extremely safe due to the monitored and monitorable interface developed between the liquid- and vapor-tight barriers isolating the cargo from the ship structure. Moreover, the novel construction of the primary and secondary barriers is such that a failure in one barrier will not induce a failure in the other barrier.

For a more complete understanding of the invention and its attendant advantages, reference should be made to the following detailed description taken in conjunction with the accompanying drawing in which.

Figure 1:
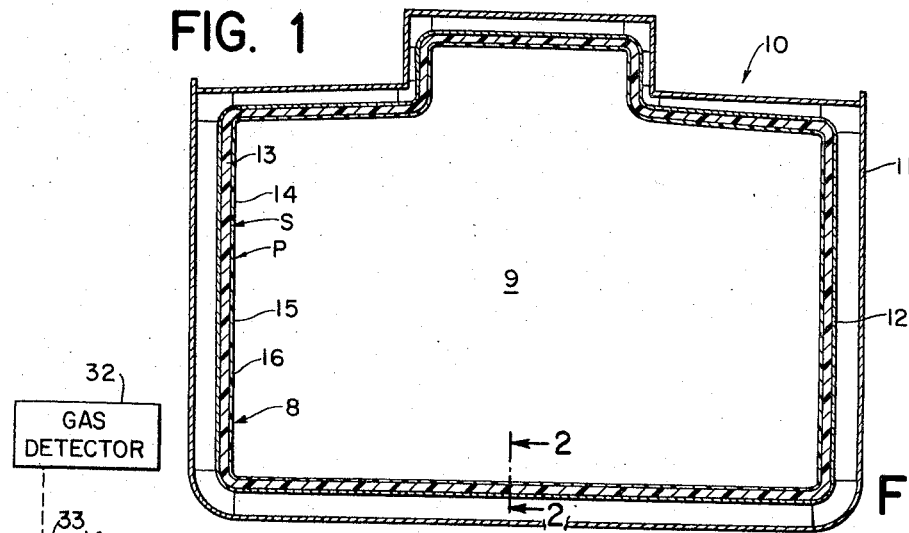
FIG. 1 is a transverse cross-sectional view of the cargo hold of a tanker embodying the new and improved cryogenic insulation system of the invention.

Referring to FIG. 1, the intended environment of the present invention is in a closed cargo hold 9 of a double hulled tanker 10 having an outer hull 11, an inner hull 12, and transverse cofferdams or bulkheads (not shown). As is conventional in ships of this general type, the hull and bulkhead structures are fabricated from mild steel plate and are therefore subject to embrittlement and to failure if contacted by a liquefied natural gas at the extremely low, cryogenic temperatures contemplated (of about −260° F. for methane, for example).

In accordance with the present invention, a safe and reliable prismatic container 8 for the storage of liquefied natural gases may be formed by first lining the inside walls of a cargo hold 9 with stepped insulating panels 13, constructed generally in accordance with the principles established in the above-identified, copending Harold R. Pratt et al. application, simultaneously to provide thermal insulation and to define a secondary liquid and vapor impermeable barrier, generally indicated at "S." A plurality of new and improved, dimensionally stable, laminated primary barrier panels 14 are thereafter super-imposed upon said secondary barrier in an affectively continuous, liquid- and vapor-tight array to define a primary barrier generally indicated at "P." In accordance with the invention, the primary and secondary barrier panels are mechanically fastened only in predetermined limited areas and without expansion joints, leaving an unadhered interface 15 therebetween, at which interface gas monitoring channels 16 are defined by preformed concavities in one or the other of the barriers.

Figure 2:
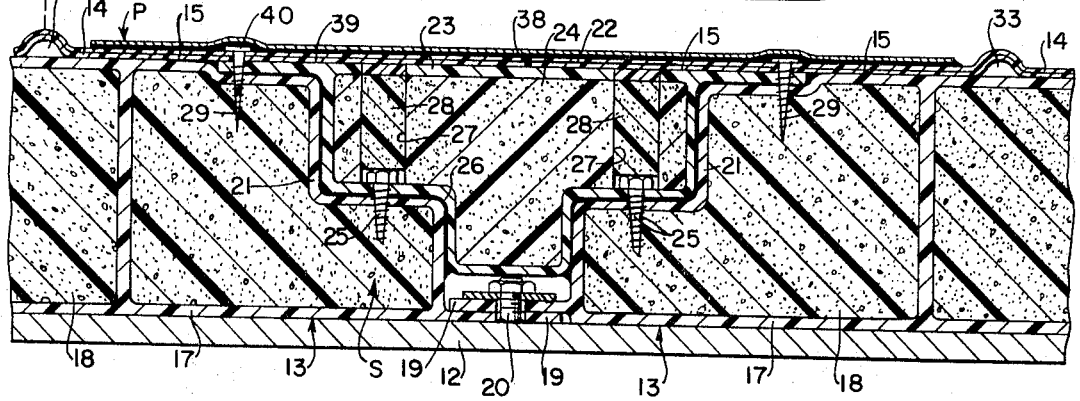
FIG. 2 is an enlarged, fragmentary, cross-sectional view taken along line 2—2 of FIG. 1 showing general details of construction.

More specifically, and as shown in FIG. 2, a liquid and vapor impermeable, effectively dimensionally stable secondary barrier is established at the inisde of a cargo hold by securing the stepped insulating panels 13 in a general end-to-end and side-by-side array to the inner hull 12. The panels 13 include fiberglass reinforced polyester shells 17 filled with polyurethane foam 18 in conformity with the teachings of the above-identified Pratt et al. application Serial No. 394,287. As shown, the stepped insulating panels 13 include overlapping outer flanges 19 through which they may be bolted to Nelson studs 20 welded to and extending inwardly from the inner hull 12. The gaps defined between the opposing stepped sides 21 of adjacent insulating panels 13 are filled by special mating plug pieces 22 which are likewise fabricated from fiberglass reinforced polyester shells 23 filled with polyurethane foam 24. As shown, the plug pieces 22 are appropriately and precisely stepped to mate with the panels 13 and are joined therewith by screws 25 and by a suitable epoxy adhesive 26 or the like, to effect a continuous, liquid and vapor impermeable secondary barrier. The screws 25 are recessed in holes 27 formed in the plug pieces 22, which holes are themselves plugged with insulating inserts 28 of polyurethane foam. The above-described secondary barrier construction is similar to and in most respects generally duplicates that described in the copending Pratt et al. application. Accordingly, the secondary barrier S is effectively dimensionally stable through the range of temperatures encountered in the contemplated cryogenic applications.

In accordance with the principles of the present invention, the primary barrier P is formed by superimposing effectively dimensionally stable primary barrier panels 14 upon the secondary barriers, in a contiguous end-to-end, side-by-side relation, without expansion joints, by spaced screws 29 or like mechanical fasteners. As an important aspect of the invention, the unadhered interface 15 between the inner side of the secondary barrier and outer side of the primary barrier effectively establishes a conduit for any leakage that may develop through a crack or other failure in the primary barrier.

Figure 3:
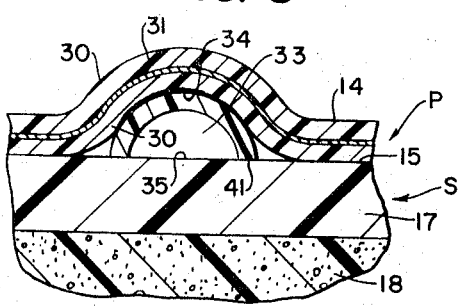
FIG. 3 is a further enlarged, fragmentary, cross-sectional view showing details of construction of the monitor channels between the primary and secondary barriers.
Figure 4:
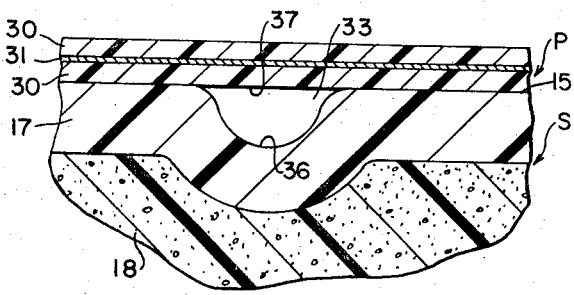
FIG. 4 is an enlarged, fragmentary, cross-sectional view showing an alternate monitor channel construction.
Figure 5:
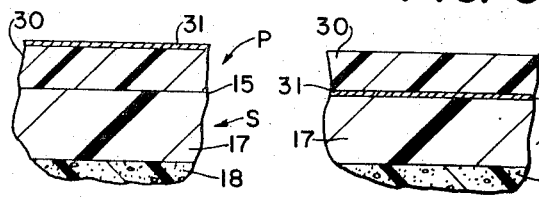
FIGS. 5 and 6 are enlarged, fragmentary, cross-sectional views showing alternative constructions of the primary barrier panels of the invention.
Figure 6:
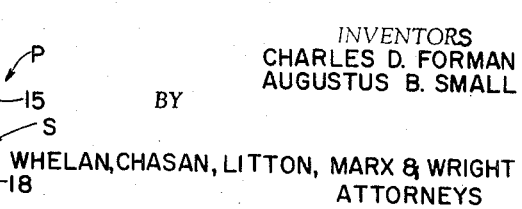

As a more specific aspect of the invention and as shown in FIG. 3, the dimensionally stable primary barrier panels 14 are formed from new and improved laminates of fiberglass reinforced polyester sheets 30 and a metal foil 31 capable of withstanding the thermal stresses induced at extremely low temperatures. Aluminum foil, copper foil, or stainless steel foil, for example, are particularly suitable. In the laminate selected, the metal foil 31 may be sandwiched between two fiberglass reinforced polyester sheets 30, as shown in FIGS. 3 and 4, and molded under heat and pressure, or it may be alternatively laminated to just one polyester sheet, as shown in FIGS. 5 and 6. Where the metal foil of the laminate of the primary barrier panel 14 is not sandwiched, as shown in FIGS. 5 and 6, the panel 14 may be superimposed upon the secondary barrier S with the foil 25 on the inside as shown in FIG. 5 or on the outside as shown in FIG. 6.

In accordance with the invention and as shown in FIG. 2, the unadhered interface 15 between the primary and secondary barriers is constantly monitored for the presence of gas that may have leaked through the primary barrier P. To that end, the conduits formed by the interfaces themselves are directly linked to a gas detector 32 by channels 33 formed by the cooperation of preformed concavities 34 in the primary barrier panels and the flat inner face 35 of the secondary barrier panels as shown in FIG. 3. Alternatively, the channels 33 may be formed by the cooperation of preformed concavities 36 in the secondary barrier panels and the flat outer face 37 of primary barrier panels as shown in FIG. 4. To insure effective and substantially instantaneous detection of leaks, the detector may be maintained under a pressure less than the atmospheric pressure in the container 8, i.e., under a slight vacuum.

The channels 33 are continuous with the joints therebetween as well as the joints 38 between the edges of adjacent panels 14 (FIG. 2) and the screws 29 being overlaid and sealed by an auxiliary, effectively dimensionally stable, impermeable sheet 39, a fiberglass reinforced polyester, for example, and an epoxy adhesive 40. Where desired or found necessary, the channel joint and/or the entire channel itself, may be reinforced by appropriately shaped half-round fiberglass pipe 41 as shown in FIG. 3, for example. Conventional plastic soldering techniques may be used to connect the pipes and insure the continuity of the formed channels 33.

As will be appreciated, a new and improved, insulated container for cryogenic materials may be efficiently formed without expansion joints and at minimum expense in accordance with the principles of the present invention. Moreover, a container embodying the inventive concepts will possess an unusual degree of safety as a result of the novel leak detection system integrally incorporated at the interface of the primary and secondary barriers. Furthermore, the relatively great independence of the barriers insures that a failure in one will not induce a failure in the other.

From the foregoing, it will be apparent that many of the advantages of the new and improved container are derived from the specific, new and improved, effectively dimensionally stable primary barrier panels. The fiberglass reinforced polyester metal foil laminated construction enables the panels to remain effectively dimensionally stable at the cryogenic temperatures of liquefied natural gases and obviates the employment of expansion joints or the like, which would otherwise be necessary if the panels were subject to contraction at low temperatures. Moreover, the laminate, itself, may be readily reformed to provide the concavities employed in the novel, integral leak detection system of the invention.

It should be understood that the specific structures herein illustrated and described are intended to be representative only, as certain changes may be made therein without departing from the clear teachings of the disclosure. Accordingly, reference should be made to the following appended claims in determining the full scope of the invention.

What is claimed is:

1. A container for the storage and/or transportation of cryogenic cargoes at atmospheric pressure comprising
(a) a closed supporting structure,
(b) a plurality of dimensionally stable, stepped insulating panels,
(c) said panels being contiguously arrayed and sealed to define a continuous, liquid and gas impermeable secondary barrier,
(d) a plurality of effectively dimensionally stable primary barrier panels of laminated construction including a metal foil and fiberglass reinforced polyester sheet,
(e) said primary barrier panels being preformed to define concavities at the outer surfaces thereof,
(f) mechanical fastening means securing said primary barrier panels to said secondary barrier panels at predetermined spaced points,
(g) dimensionally stable means sealing the joints between adjacent primary barrier panels,
(h) said concavities in cooperation with the inner faces of said secondary barrier panels forming channels in communication with the interface between said primary and secondary barriers, and
(i) gas detection means in communication with said channels and adapted to sense the presence of gas therein.

2. A container in accordance with claim 1, in which
(a) fiberglass pipe means are included in said channels.

References Cited

UNITED STATES PATENTS

| | | |
|---|---|---|
| 2,068,533 | 1/1937 | Coffman 161—94 X |
| 2,728,702 | 12/1955 | Simon et al. 220—9 |
| 2,772,860 | 12/1956 | Nelson 220—63 |
| 2,863,797 | 12/1958 | Meyer 220—9 |
| 2,896,271 | 7/1959 | Kloote et al. 220—9 |
| 2,983,401 | 5/1961 | Murphy 220—9 |
| 3,031,856 | 5/1962 | Wiedeman et al. 220—9 |
| 3,039,418 | 6/1962 | Versluis 220—9 |
| 3,082,726 | 3/1963 | Dosker 114—74 |
| 3,088,621 | 5/1963 | Brown 220—9 |
| 3,158,383 | 11/1964 | Anderson et al. 220—9 |
| 3,158,459 | 11/1964 | Guilhem 220—15 X |
| 3,197,352 | 7/1965 | Coates. |

THERON E. CONDON, *Primary Examiner.*

JAMES R. GARRETT, *Examiner.*